US011733599B2

(12) United States Patent
Sugiyama

(10) Patent No.: US 11,733,599 B2
(45) Date of Patent: *Aug. 22, 2023

(54) LIGHT SOURCE UNIT INCLUDING A PLURALITY OF LIGHT SOURCES AND PROJECTOR INCLUDING THE LIGHT SOURCE UNIT

(71) Applicant: CASIO COMPUTER CO., LTD., Tokyo (JP)

(72) Inventor: Chihaya Sugiyama, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/592,999

(22) Filed: Feb. 4, 2022

(65) Prior Publication Data

US 2022/0155664 A1 May 19, 2022

Related U.S. Application Data

(63) Continuation of application No. 16/560,801, filed on Sep. 4, 2019, now Pat. No. 11,275,297.

(30) Foreign Application Priority Data

Oct. 1, 2018 (JP) ................. 2018-186676

(51) Int. Cl.
 *G03B 21/20* (2006.01)
 *G02B 27/28* (2006.01)

(52) U.S. Cl.
 CPC ......... *G03B 21/204* (2013.01); *G02B 27/283* (2013.01); *G03B 21/20* (2013.01); *G03B 21/2073* (2013.01)

(58) Field of Classification Search
 CPC .. G03B 21/204; G03B 21/20; G03B 21/2073; G02B 27/283
 See application file for complete search history.

(56) References Cited

U.S. PATENT DOCUMENTS 8,517,541 B2 8/2013 Kimoto et al.
9,155,161 B2 10/2015 Murai
(Continued)

FOREIGN PATENT DOCUMENTS

CN 103775869 A 5/2014
CN 107436527 A 12/2017
(Continued)

OTHER PUBLICATIONS

JPO; Application No. 2018-186676; Notice of Reasons for Refusal dated Jul. 30, 2020.
(Continued)

*Primary Examiner* — Bao-Luan Q Le
(74) *Attorney, Agent, or Firm* — Fitch, Even, Tabin & Flannery LLP

(57) ABSTRACT

A light source unit of the present invention includes a first light source and a second light source that are configure to emit light in a first wavelength range, a luminescent plate configured to be excited by the light in a first wavelength range to emit light in a second wavelength range, and a dichroic filter provided on one surface side of the luminescent plate and configured to transmit the light in a second wavelength, and the light in a first wavelength range emitted from the first light source is incident on the dichroic filter at an angle within a first incident angle range, and the light in a first wavelength range emitted from the second light source is incident on the dichroic filter at an angle within a second incident angle range that is greater than the first incident angle range.

13 Claims, 5 Drawing Sheets

(56) References Cited

U.S. PATENT DOCUMENTS

| | | | |
|---|---|---|---|
| 9,395,611 B2 | 7/2016 | Nishikawa et al. | |
| 9,575,401 B2 | 2/2017 | Nishikawa et al. | |
| 10,101,010 B2 | 10/2018 | Khrushchev | |
| 10,133,164 B2 | 11/2018 | Okuda | |
| 2006/0023172 A1* | 2/2006 | Ikeda | G02B 19/0028 353/94 |
| 2010/0079730 A1* | 4/2010 | Shibasaki | H04N 9/3164 353/31 |
| 2011/0242496 A1* | 10/2011 | Kimoto | G03B 21/16 353/30 |
| 2011/0292349 A1* | 12/2011 | Kitano | G03B 21/2013 353/31 |
| 2012/0106126 A1* | 5/2012 | Nojima | H04N 9/3114 362/296.01 |
| 2013/0201408 A1* | 8/2013 | Murai | G03B 21/2033 315/153 |
| 2013/0242268 A1* | 9/2013 | Saitou | G03B 21/20 353/121 |
| 2014/0111775 A1* | 4/2014 | Nishikawa | G03B 21/2013 353/31 |
| 2014/0168614 A1* | 6/2014 | Matsubara | G02B 27/141 353/31 |
| 2015/0293432 A1* | 10/2015 | Kimura | G03B 21/204 353/31 |
| 2016/0282709 A1 | 9/2016 | Nishikawa et al. | |
| 2017/0082912 A1* | 3/2017 | Wakabayashi | G03B 21/2013 |
| 2017/0199451 A1* | 7/2017 | Akiyama | G02B 27/0961 |
| 2017/0205049 A1* | 7/2017 | Khrushchev | F21S 41/16 |
| 2017/0347075 A1* | 11/2017 | Okuda | G03B 21/204 |
| 2018/0088452 A1* | 3/2018 | Tajiri | G03B 33/12 |
| 2018/0217486 A1* | 8/2018 | Tanaka | G03B 21/28 |
| 2019/0064644 A1* | 2/2019 | Okumura | G03B 21/204 |

FOREIGN PATENT DOCUMENTS

| | | |
|---|---|---|
| CN | 111566558 A | 8/2020 |
| JP | WO2012/077191 A1 | 6/2012 |
| JP | 2012-199075 A | 10/2012 |
| JP | 2012-212129 A | 11/2012 |
| JP | 2014503117 A | 2/2014 |
| JP | 2015-82025 A | 4/2015 |
| JP | WO2017/018372 A1 | 2/2017 |
| JP | 2018077462 A | 5/2018 |
| WO | 2012091973 A1 | 7/2012 |
| WO | 2019142698 A1 | 7/2019 |

OTHER PUBLICATIONS

CNIPA; Application No. 201910916595.8; First Office Action dated Mar. 16, 2021.

* cited by examiner

LIGHT SOURCE UNIT INCLUDING A PLURALITY OF LIGHT SOURCES AND PROJECTOR INCLUDING THE LIGHT SOURCE UNIT

CROSS-REFERENCE TO RELATED APPLICATION

This application is a continuation of prior U.S. application Ser. No. 16/560,801, filed on Sep. 4, 2019, which claims the benefit of Japanese Patent Application No. 2018-186676 filed on Oct. 1, 2018, the entire disclosure of which is incorporated by reference herein.

BACKGROUND OF THE INVENTION

Field of the Invention

The present invention relates to a light source unit and a projector including the light source unit.

Description of the Related Art

In these days, projectors are used in which light emitted from a light source is collected onto a micromirror display device called a digital micromirror device (DMD) or a liquid crystal panel so as to display a color image onto a screen.

For example, Japanese Patent Laid-Open No. 2012-212129 (JP-A-2012-212129) discloses a light source unit that includes an excitation light source made up of a laser light source, a first wheel provided with a luminescent material layer excited by excitation light emitted from the excitation light source and configured to reflect luminescent light emitted from the luminescent material layer, and a dichroic mirror provided between the first wheel and the excitation light source and configured to guide luminescent light and excitation light to an illuminating optical system. The first wheel is divided into a plurality of segments, and at least one segment reflects excitation light, while a luminescent material layer emitting light having a wavelength in the red, yellow or green wavelength range is provided on at least two segments. Additionally, a quarter wave plate changing the polarization direction is disposed between the first wheel and the dichroic mirror.

In the light source unit disclosed in JP-A-2012-212129, since excitation light emitted from the excitation light source is shined on to the first wheel, which is rotating, to emit light having a wavelength in the blue wavelength range, light having a wavelength in the red wavelength range and light having a wavelength range in the green wavelength range in a time sharing manner, it is difficult to reduce the size of the light source further.

SUMMARY OF THE INVENTION

The present invention has been made in view of the situations described above, and an object of the present invention is to provide a light source unit whose configuration is simplified and a projector including the light source unit.

According to an aspect of the present invention, there is provided a light source unit including:

a first light source and a second light source that are configure to emit light in a first wavelength range;

a luminescent plate configured to be excited by the light in a first wavelength range to emit light in a second wavelength range; and a dichroic filter provided on one surface side of the luminescent plate and configured to transmit the light in a second wavelength, wherein the light in a first wavelength range emitted from the first light source is incident on the dichroic filter at an angle within a first incident angle range, and wherein the light in a first wavelength range emitted from the second light source is incident on the dichroic filter at an angle within a second incident angle range that is greater than the first incident angle range.

According to another aspect of the present invention, there is provided a projector including:

the light source unit described above;

a display device on to which light source light from the light source unit is shined to form image light;

a projection optical system configured to project the image light emitted from the display device on to a screen; and a control unit configured to control the display device and the light source unit.

DETAILED DESCRIPTION OF THE PREFERRED EMBODIMENTS

First Embodiment

Figure 1:
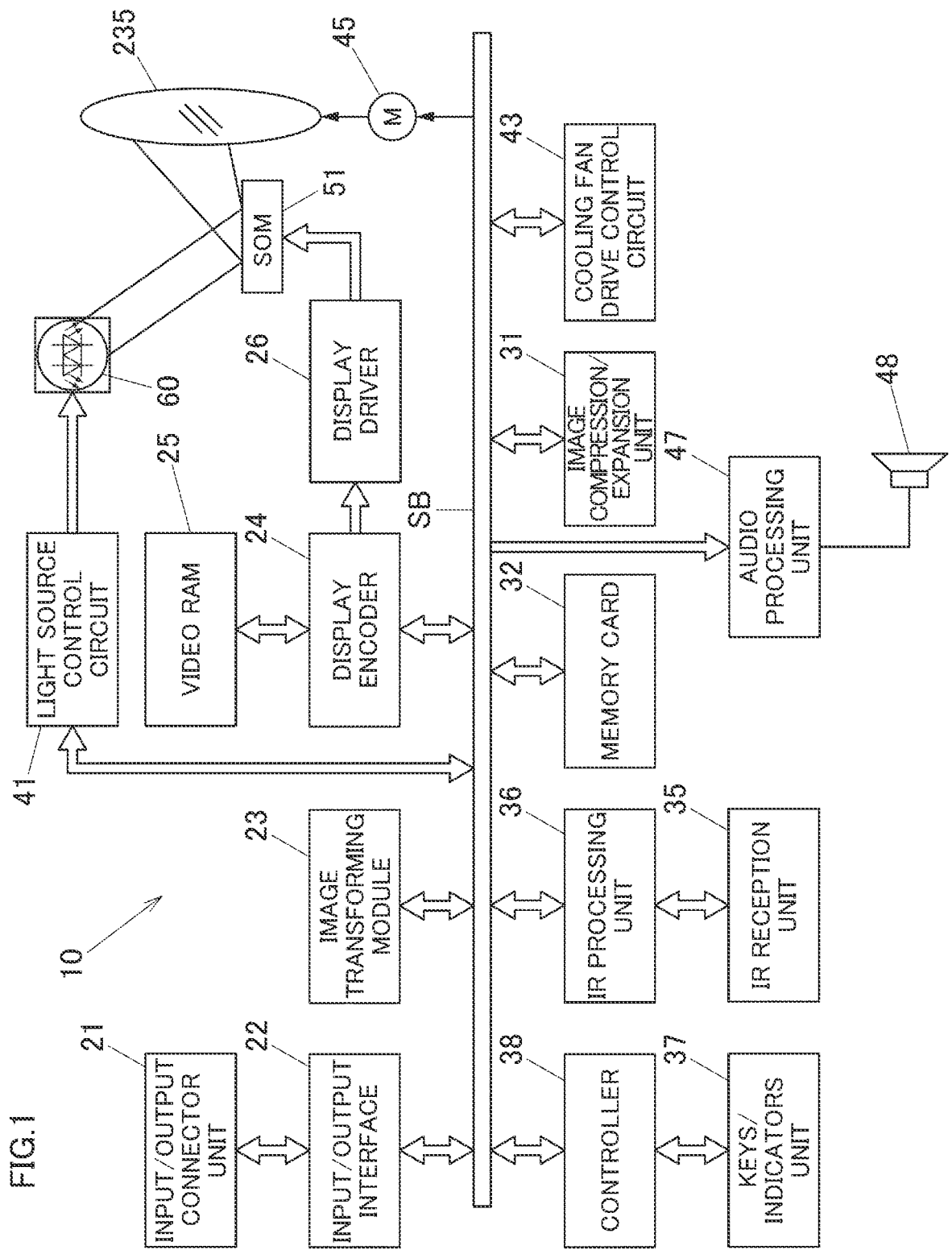
FIG. 1 is a block diagram illustrating functional circuit blocks of a projector according to a first embodiment of the present invention.

Hereinafter, a first embodiment of the present invention will be described. FIG. 1 is a block diagram illustrating functional circuit blocks of a projector 10. A projector control unit includes a CPU including an image transforming module 23 and a controller 38, and a front-end unit including an input/output interface 22, and a formatter unit including a display encoder 24 and a display driver 26. Image signals of various standards which are inputted from an input/output connector unit 21 are sent, via the input/output interface 22 and a system bus (SB), to the image transforming module 23, where the image signals are transformed so as to be unified into an image signal of a predetermined format which is suitable for display. Thereafter, the unified image signal to the display encoder 24.

The display encoder 24 deploys the inputted image signal on a video RAM 25 for storage in it and generates a video signal from the contents stored in the video RAM 25, outputting the video signal so generated to the display driver 26.

The display driver 26 functions as a display device controller. The display driver 26 drives a display device 51, which is a spatial optical modulator (SOM), at an appropriate frame rate according to the image signal outputted from the display encoder 24. Then, in the projector 10, pencils of light emitted from a light source unit 60 are shined on to the display device 51 by way of a light guiding optical system to thereby form an optical image by light reflected from the display device 51, and the image so formed is then projected onto a screen, not illustrated, for display by way of a projection optical system, which will be described later. A movable lens group 235 of the projection optical system is driven by a lens motor 45 for zooming and focusing.

An image compression/expansion unit 31 performs a recording process in which a luminance signal and a color difference signal of an image signal are data compressed through processing of Adaptive Discrete Cosine Transform (ADCT) and Huffman coding, and the compressed data is sequentially written on a memory card 32, which constitutes a detachable recording medium. Further, with the projector 10 set in a reproducing mode, the image compression/expansion unit 31 reads out the image data recorded in the memory card 32 and expands the individual image data that makes up a series of dynamic images frame by frame. Then, the image compression/expansion unit 31 outputs the image data to the display encoder 24 by way of the image transforming module 23 and enables the display of dynamic images based on the image data stored in the memory card 32.

The controller 38 governs the control of operations of individual circuitries inside the projector 10 and includes CPU, ROM storing fixedly operation programs such as various settings, RAM that is used as a work memory, and the like.

Operation signals from a keys/indicators unit 37 including main keys and indicators which are provided on an upper panel of a casing of the projector 10 are sent out directly to the controller 38. Key operation signals from a remote controller are received by an IR reception unit 35 and are then demodulated into a code signal at an Ir processing unit 36 for output to the controller 38.

The controller 38 is connected with an audio processing unit 47 by way of a system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The controller 38 controls a light source control circuit 41, which functions as a light source control unit. The light source control circuit 41 controls individually operations of an excitation light shining device 70, a green light source device 80, and a red light source device 120 (refer to FIG. 2) of the light source unit 60 so that light in predetermined wavelength ranges required in generating an image is emitted from the light source unit 60.

Further, the controller 38 causes a cooling fan drive control circuit 43 to detect temperatures with a plurality of temperature sensors which are provided in the light source unit 60 so as to control revolution speeds of cooling fans based on the results of the temperature detections. Additionally, the controller 38 also causes the cooling fan drive control circuit 43 to keep the cooling fans revolving by use of a timer or the like even after a power supply to a main body of the projector 10 is switched off. Alternatively, the controller 38 causes the cooling fan drive control circuit 43 to cut off the power supply to the main body of the projector 10 depending upon the results of the temperature detections by the temperature sensors.

Figure 2:
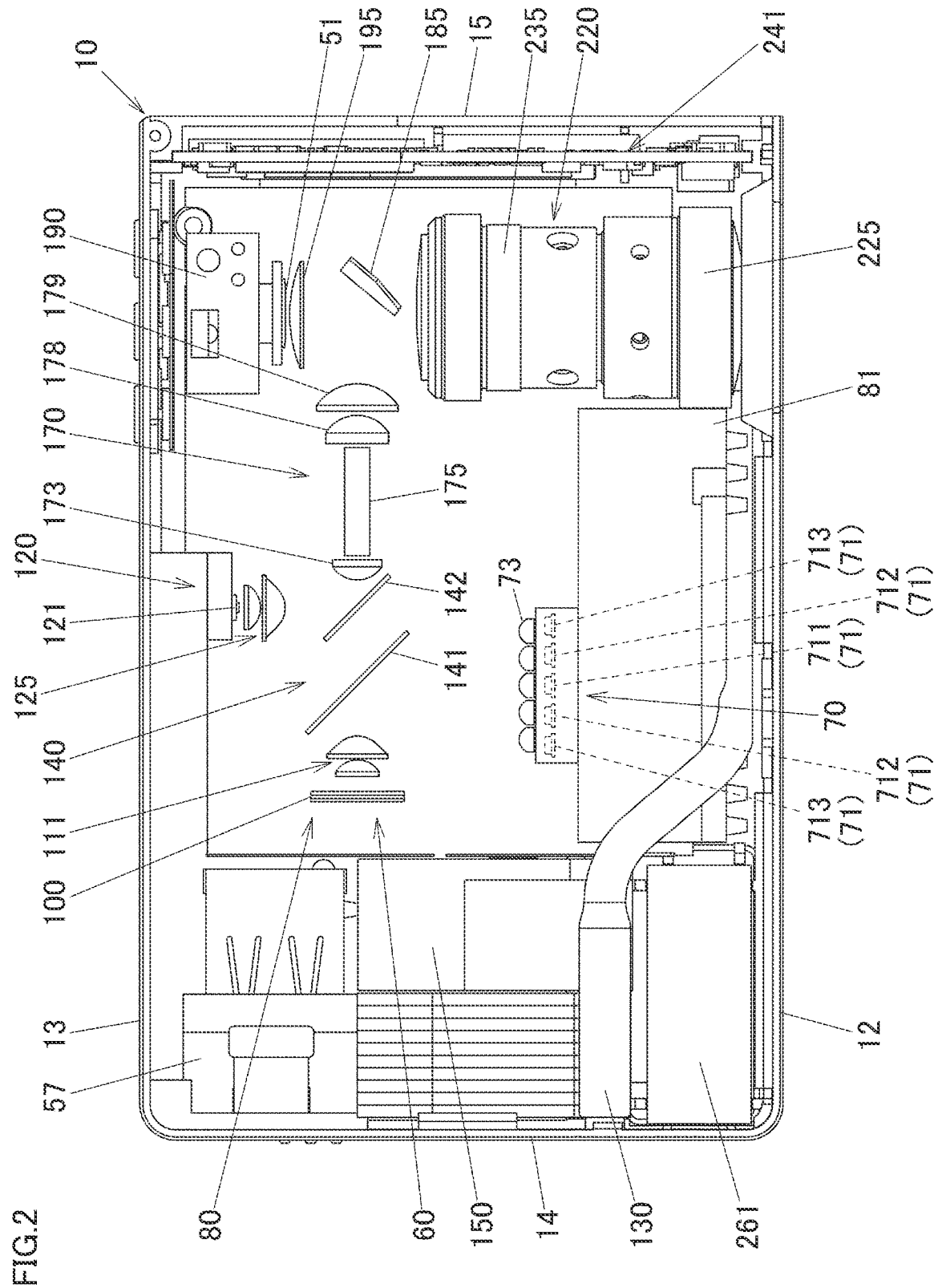
FIG. 2 is a schematic plan view illustrating an internal structure of the projector according to the first embodiment of the present invention.

FIG. 2 is a schematic plan view illustrating an internal structure of the projector 10. It should be noted that in the following description, when left and right are referred to in relation to the projector 10, they denote, respectively, left and right directions with reference to a projecting direction of the projector 10. When front and rear are referred to in relation to the projector 10, they denote, respectively, front and rear directions with reference to a direction from the projector 10 towards a screen and a traveling direction of a pencil of light from the projector 10.

The projector 10 includes a control circuit board 241 in the vicinity of a left panel 15. This control circuit board 241 includes a power supply circuit block, a light source control block, and the like. The projector 10 also includes the light source unit 60 at a substantially central portion of the casing of the projector 10. Further, the projector 10 includes a light source-side optical system 170 and a projection optical system 220 that are disposed between the light source unit 60 and the left panel 15.

The light source unit 60 includes the excitation light shining device 70, which constitutes not only a light source of light of a wavelength in the blue wavelength range or, simply, light in the blue wavelength range (light in a first wavelength range) but also an excitation light source, a green light source device 80, which constitutes a light source of light of a wavelength in the green wavelength range or, simply, light in the green wavelength range (light in a second wavelength range), the red light source device 120, which constitutes a light source of light of a wavelength in the red wavelength range or, simply, light in the red wavelength range (light in a third wavelength range), and a light guiding optical system 140.

The excitation light shining device 70 is disposed at a substantially central portion of the casing of the projector 10 in a left-right direction. The excitation light shining device 70 includes a light source group made up of blue laser diodes 71 (blue laser diodes 711, 712 which constitute a first light source, and blue laser diodes 713 which constitute a second light source) that are a plurality of semiconductor light emitting elements disposed in such a manner that optical axes thereof are parallel to a right panel 14 and the left panel 15, and a heat sink 81 disposed between the blue laser diodes 71 and a front panel 12, and the like.

The light source group is formed by arranging the plurality of laser diodes 71 into a matrix configuration. In this embodiment, assuming that a left-right direction in FIG. 2 is referred to as a row and a direction perpendicular to a surface of a sheet of paper on which FIG. 2 is drawn is referred to as a column, a total of 10 blue laser diodes is arranged into a matrix configuration of two rows and five columns in a side view as viewed from a rear panel 13. In a plan view of the projector 10, a column of blue laser diodes 711 (71) is positioned at a center of the excitation light shining device 70, and columns of blue laser diodes 712 (71) are positioned on both sides of the column of blue laser diodes 711 (71). Columns of blue laser diodes 713 (71) are positioned individually on outer sides of the corresponding columns of blue laser diodes 712 (71). Light beams L1 to L3 in the blue wavelength range are emitted from the blue laser diodes 71 towards a polarization beam splitter 141 as a polarized light of s-polarized light.

A plurality of collimator lenses 73 are disposed individually on optical axes of the blue laser diodes 71 so as to convert light emitted from the corresponding blue laser diodes 71 into parallel light to thereby enhance the directivity of the emitted light. The collimator lenses 73 are disposed in such a manner as to deviate towards the central column of blue laser diodes 711 in the matrix of blue laser diodes 71. Additionally, a deviation amount of the collimator lenses 73 is made to become greater as the collimator lenses 73 lie farther away from the central column of blue laser diodes 711. The blue laser diodes 71 are formed into the two rows in FIG. 2, and the collimator lenses 73 disposed for the blue laser diodes 711, 712, 713 in an upper row are also disposed in such a manner as to slightly deviate downwards. Thus, the light beams L2, L3 in the blue wavelength range emitted from the outer blue laser diodes 712, 713 can be collected towards the light beam L1 in the blue wavelength range by disposing the collimator lenses 73 in such a manner as to be eccentric inwards in the way described above, whereby an effective diameter of an optical member such as a collective lens group 111 can be reduced.

A power supply connector 57 and a heat sink 150 are disposed sequentially in this order as seen from the rear panel 13 between the light source unit 60 and the right panel 14. In addition, the light source unit 60 includes a heat pipe 130 configured to guide heat generated in the excitation light shining device 70 to the heat sink 150 and a cooling fan 261 configured to cool the heat sink 150. The blue laser diodes 71 are cooled by this cooling fan 261, the heat pipe 130, and the heat sinks 81, 150.

Figure 3:
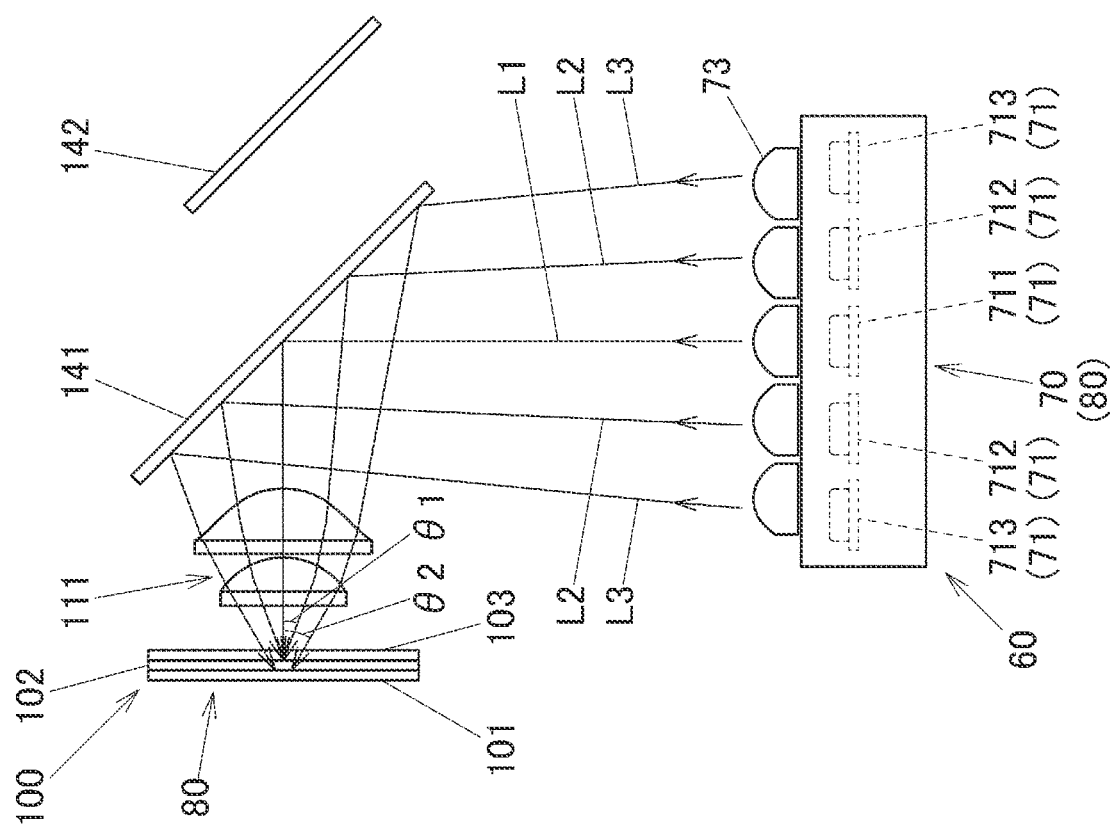
FIG. 3 is a partially plan schematic view of a light source unit according to the first embodiment of the present invention.

The green light source device 80 is made up of the excitation light shining device 70 and a luminescent light emitting device 100. As illustrated in FIG. 3, the luminescent light emitting device 100 includes a luminescent plate 101, a dichroic filter 102, a quarter wave plate 103, and the collective lens group 111. The luminescent plate 101, the dichroic filter 102, and the quarter wave plate 103 are formed integrally. The collective lens group 111 collects pencils of excitation light emitted from the excitation light shining device 70 towards the luminescent light emitting device 100 and also collects pencils of light emitted from the luminescent light emitting device 100 towards the polarization beam splitter 141.

The luminescent plate 101 is disposed in such a manner as to intersect an axis of light emitted from the excitation light shining device 70 and guided via the polarization beam splitter 141 at right angles. The luminescent plate 101 includes a base material in which a surface on a side facing the dichroic filter 102 is mirror finished through silver deposition or the like to constitute a reflecting surface and a green luminescent material formed on the base material. When light in the blue wavelength range emitted from the excitation light shining device 70 is shined on to the luminescent plate 101, the luminescent plate 101 emits light in the green wavelength range as luminescent light. Since the surface of the base material of the luminescent plate 101 is mirror finished to constitute the reflecting surface, the light in the green wavelength range is reflected towards the collective lens group 111. The base material can be formed of metal such as copper, aluminum, or the like. Alternatively, the luminescent plate 101 may be formed of a sintered luminescent material containing a luminescent material and an inorganic binder, and in this case, no base material needs to be provided.

Figure 4A:
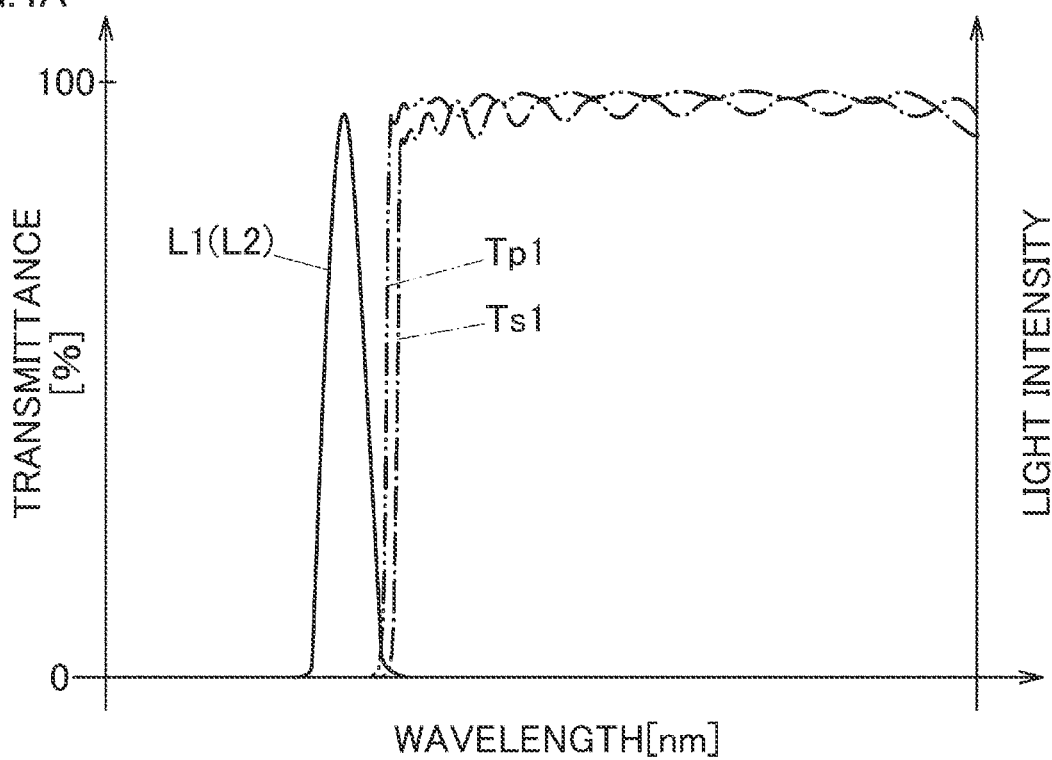
FIG. 4A is a diagram illustrating a transmission characteristic of light incident on a dichroic filter according to the first embodiment of the present invention at a first incident angle.

The dichroic filter 102 is formed on the luminescent plate 101 through coating. Here, referring to FIGS. 4A, 4B, transmission characteristics of the dichroic filter 102 will be described. FIG. 4A shows transmission characteristics Ts1, Tp1 when light is incident on the dichroic filter 102 at a first incident angle $\theta 1$, which is a relatively small incident angle. The transmission characteristic Ts1 denotes a characteristic of light when s-polarized light is incident on the dichroic filter 102, while the transmission characteristic Tp1 denotes a characteristic of light when p-polarized light is incident on the dichroic filter 102. The first incident angle $\theta 1$ can be, for example, almost 0 degree or 15 degrees. In the case where the first incident angle $\theta 1$ is 0 degree, cuton wavelengths of the transmission characteristics Ts1, Tp1 are substantially the same in FIG. 4. In the case where the first incident angle $\theta 1$ is 15 degrees, the cuton wavelengths of the transmission characteristics Ts1, Tp1 are close to each other in FIG. 4. In these cases, the transmission characteristics Ts1, Tp1 are situated closer to a long wavelength side than peak wavelengths of the light rays L1, L2 in the blue wavelength range emitted from the blue laser diodes 711. Additionally, the dichroic filter 102 reflects light shined in a wavelength range closer to a short wavelength side where the transmittance of the transmission characteristics Ts1, Tp1 is substantially 0%. Consequently, the dichroic filter 102 can reflect most of s-polarized light and p-polarized light in the blue wavelength range that are incident on the dichroic filter 102 at the first incident angle $\theta 1$.

Although the light beam L2 in the blue wavelength range is incident on the dichroic filter 102 at a greater incident angle than the light beam L1 in the blue wavelength range as illustrated in FIG. 3, as with the light beam L1 in the blue wavelength range illustrated in FIG. 4A, cuton wavelengths of transmission characteristics Ts1, Tp1 are situated closer to a long wavelength side than a peak wavelength of the light beam L2 in the blue wavelength range, and most of the light beam L2 in the blue wavelength range is reflected by the dichroic filter 102. In this way, the light beams L1, L2 in the blue wavelength range emitted from the blue laser diodes 711, 712 are incident on the dichroic filter 102 at the first incident angle $\theta 1$ that falls in the range where light incident on the dichroic filter 102 can be reflected by the dichroic filter 102.

Figure 4B:
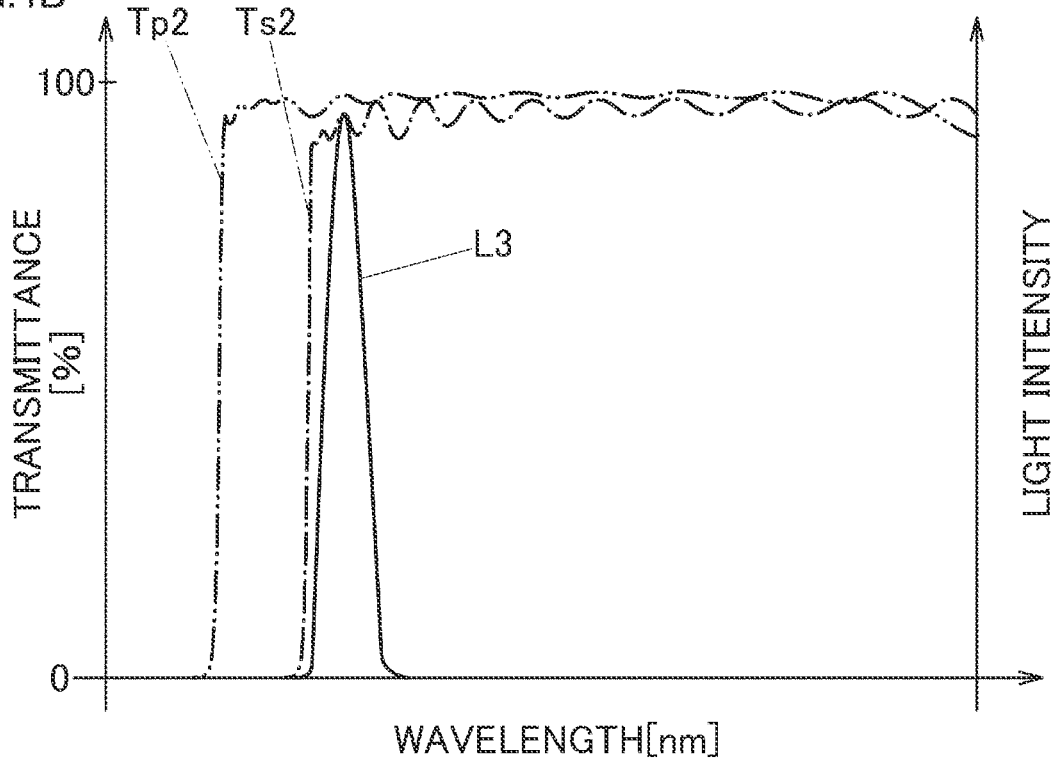
FIG. 4B is a diagram illustrating a transmission characteristic of light incident on the dichroic filter according to the first embodiment of the present invention at a second incident angle.

FIG. 4B shows transmission characteristics Ts2, Tp2 when light is incident on the dichroic filter 102 at a second incident angle $\theta 2$, which is greater than the first incident angle $\theta 1$. The transmission characteristic Ts2 denotes a characteristic of light when s-polarized light is incident on the dichroic filter 102, while the transmission characteristic Tp2 denotes a characteristic of light when p-polarized light is incident on the dichroic filter 102. The second incident angle $\theta 2$ can be, for example, 45 degree or 65 degrees. In the case where the incident angle is the second incident angle $\theta 2$, cuton wavelengths of the transmission characteristics Ts2, Tp2 shift further towards a short wave side than the transmission characteristics Ts1, Tp1 shown in FIG. 4A. In addition, the case where the incident angle is the second incident angle $\theta 2$, the cuton wavelength of the transmission characteristic Tp2 and the cuton wavelength of the transmission characteristic Ts2 is spaced apart more than the transmission characteristics Ts1, Tp1 when the incident angle is the first incident angle $\theta 1$. However, both the cuton wavelength of the transmission characteristic Ts2 and the cuton wavelength of the transmission characteristic Tp2 are situated closer to the short wavelength side than a peak wavelength of the light beam L3 in the blue wavelength range emitted by the blue laser diodes 713. Thus, the dichroic filter 102 can transmit most of s-polarized light and p-polarized light in the blue wavelength range that are incident on the dichroic filter 102 at the second incident angle θ2. In this way, the light beam L3 in the blue wavelength range emitted from the blue laser diodes 713 is incident on the dichroic filter 102 at the second incident angle θ2 that falls in the range where light incident on the dichroic filter 102 can be transmitted by the dichroic filter 102.

In this way, the dichroic filter 102 is formed so that the cuton wavelengths of the transmission characteristics Ts1, Tp1 are situated on the long wavelength side of light in the blue wavelength range when the incident angle of light is the first incident angle θ1 (FIG. 4A), while the cuton wavelengths are situated on the short wavelength side of light in the blue wavelength range when the incident angle of light is the second incident angle θ2 that is greater than the first incident angle (FIG. 4B). That is, the light beams L1, L2 in the blue wavelength range (light in a first wavelength range) emitted from the blue laser diodes 711, 711A, 712, 712A (71, 71A) (a first light source) are incident on the dichroic filter 102 at an angle that falls within the first incident angle range including the first incident angle θ1, while the light beam L3 in the blue wavelength range (light in a first wavelength range) emitted from the blue laser diodes 713, 713A (71, 71A) (a second light source) is incident on the dichroic filter 102 at an angle that falls within the second incident angle range including the second incident angle θ2 that is greater than the first incident angle θ1.

Returning to FIG. 3, the quarter wave plate 103 is formed on the dichroic filter 102. The quarter wave plate 103 can shift light in the blue wavelength range emitted from the excitation light shining device 70 and then shined through the collective lens group 111 in phase 90 degrees. Consequently, the light beams L1 to L3 in the blue wavelength range, which are linearly polarized light, are converted into linearly polarized light whose polarization direction differs 90 degrees from that of the original linearly polarized light by double passing the quarter wave plate 103.

As shown in FIG. 2, the red light source device 120 includes a red light emitting diode 121 (a third light source) disposed in such a manner that an optical axis thereof becomes substantially parallel to optical axes of the blue laser diodes 71 and a collective lens group 125 configured to collect light emitted from the red light emitting diode 121. The red light emitting diode 121 is a semiconductor light element that emits light in the red wavelength range.

The light guiding optical system 140 includes the polarization beam splitter 141 and a dichroic mirror 142. The polarization beam splitter 141 is disposed between the collective lens group 111 and the dichroic mirror 142 and is disposed on a side of the excitation light shining device 70 that faces the rear panel 13. The polarization beam splitter 141 can separate or split polarization components. The polarization beam splitter 141 reflects s-polarized light in the blue wavelength range and transmits p-polarized light in the blue wavelength range, the polarization direction of the p-polarized light being different 90 degrees from that of the s-polarized light. Consequently, the polarization beam splitter 141 reflects s-polarized light in the blue wavelength range emitted from the excitation light emitting device 70 towards the luminescent light emitting device 100 and transmits p-polarized light in the blue wavelength range emitted from the luminescent light emitting device 100. The polarization beam splitter 141 transmits light in the green wavelength range emitted from the luminescent light emitting device 100 towards the dichroic mirror 142.

The dichroic mirror 142 is disposed on an axis of light in the red wavelength range emitted from the red light source device 120 and between the polarization beam splitter 141 and a collective lens 173. The dichroic mirror 142 reflects light in the red wavelength range emitted from the red light source device 120 to the collective lens 173. Additionally, the dichroic mirror 142 guides and transmits light in the blue wavelength range and light in the green wavelength range that are emitted from the polarization beam splitter 141 to the collective lens 173.

Here, an optical path of light in the blue wavelength range emitted from the excitation light shining device 70 will be described. Light beams L1, L2 in the blue wavelength range emitted from the blue laser diodes 711, 712 shown in FIG. 3 are incident on the polarization beam splitter 141 in the form of s-polarized light and are then reflected towards the collective lens 111 by the polarization beam splitter 141. The light beams L1, L2 are collected by the collective lens group 111, thereafter, are caused to shift in phase 90 degrees by the quarter wave plate 103 to be converted from linearly polarized light to circularly polarized light, and are incident on the dichroic filter 102. Since the light beams L1, L2 in the blue wavelength range are incident on the dichroic filter 102 at the first incident angle θ1, which is relatively small, most of the light beams L1, L2 are reflected on the dichroic filter 102 as indicated by the transmission characteristics Ts1, Tp1 in FIG. 4A.

The light beams L1, L2 in the blue wavelength range reflected by the dichroic film 102 pass the quarter wave plate 103 again, whereby the light beams L1, L2 are caused to shift in phase another 90 degrees, whereby the light beams L1, L2 are converted from circularly polarized light into linearly polarized light. A polarization direction (a second polarization direction) at this time differs 90 degrees from the polarization direction (a first polarization direction) in which the light beams L1, L2 are incident on the luminescent light emitting device 100 from the polarization beam splitter 141. In this embodiment, the first polarization direction is the direction of s-polarized light relative to the polarization beam splitter 141, and the second polarization direction is the direction of p-polarized light relative to the polarization beam splitter 141. The light beams L1, L2 in the blue wavelength range emitted from the quarter wave plate are collected by the collective lens group 111 and are then incident on the polarization beam splitter 141 in the form of p-polarized light. Consequently, the polarization beam splitter 141 transmits the light beams L1, L2 in the blue wavelength range emitted from the luminescent light emitting device 100 and guides them to the dichroic mirror 142.

Since the blue laser diodes 713 are configured to be arranged sideways with respect to the blue laser diodes 711, 712, light beams L3 emitted from the blue laser diodes 713 arrive at the dichroic filter 102 by way of the same optical member (the polarization beam splitter 141 and the collective lens group 111 in FIG. 3) as that by way of which the light beams L1, L2 emitted from the blue laser diodes 711, 712 arrive.

The light beams L3 emitted from the blue laser diodes 713 shown in FIG. 3 are incident on the polarization beam splitter 141 in the form of s-polarized light and are then reflected towards the collective lens group 111 by the polarization beam splitter 141. The light beams L3 in the blue wavelength range are collected by the collective lens group 111, thereafter, are caused to shift in phase 90 degrees by the quarter wave plate 103 to thereby be converted from linearly polarized light to circularly polarized light, and are incident on the dichroic filter 102. Since the light beams L3 in the blue wavelength range are incident on the dichroic filter 102 at the second incident angle θ2, which is greater than the first incident angle θ1, most of the light beams L3 are allowed to pass through the dichroic filter 102 as indicated by the transmission characteristics Ts2, Tp2 in FIG. 4B.

The light beams L3 in the blue wavelength range pass through the dichroic filter 102 and are then incident on the luminescent plate 101 to excite the green luminescent material formed on the luminescent plate 101. When the light beams L3 in the blue wavelength range are shined on to the green luminescent material, the green luminescent material emits randomly polarized light in the green wavelength range in every direction. Since the base material of the luminescent plate 101 is mirror finished, light in the green wavelength range emitted towards the luminescent plate 101 is reflected towards the collective lens group 111.

Light in the green wavelength range emitted from the luminescent plate 101 is incident on the dichroic mirror 142. Since light in the green wavelength range is light having a longer wavelength than that of light in the blue wavelength range, light in the green wavelength range can pass through the dichroic mirror 102. Thus, the dichroic mirror 102 transmits light in the green wavelength range emitted from the luminescent plate 101, causing it to be incident on the quarter wave plate 103. Thereafter, the light in the green wavelength range passes through the quarter wave plate 103 while being shifted in phase 90 degrees and is then collected by the collective lens group 111, whereafter the light in the green wavelength range is emitted towards the polarization beam splitter 141. The polarization beam splitter 141 transmits the light in the green wavelength range collected at the collective lens group 111 and guides it to the dichroic mirror 142.

The excitation light shining device 70 can switch emission of excitation light by the blue laser diodes 71 thereof between emission of light beams L1, L2 in the blue wavelength range by the blue laser diodes 711, 712 so as to be incident on the dichroic filter 102 at the first incident angle θ1 and emission of light beams L3 in the blue wavelength range by the blue laser diodes 713 so as to be incident on the dichroic filter 102 at the second incident angle θ2 in a time-sharing manner. As a result, the light source unit 60 can emit light in the blue wavelength range and light in the green wavelength range from the luminescent light emitting device 100 by switching the emission of light therefrom between the emission of light in the blue wavelength range and the emission of light in the green wavelength range in a time-sharing manner.

The light source-side optical system 170 includes the collective lens 173, a light guiding device 175 such as a light tunnel, a glass rod, or the like, collective lenses 178, 179, a light shining mirror 185, and a condenser lens 195. The condenser lens 195 emits image light emitted from the display device 51 that is disposed on a side of the condenser lens 195 that faces the rear panel 13 towards the projection optical system 220, and hence, the condenser lens 195 also makes up part of the projection optical system 220.

The collective lens 173 is disposed near an incident port of the light guiding device 175 and collects light source light from the light source unit 60. Light beams in the blue, red, and green wavelength ranges emitted from the light source unit 60 are collected by the collective lens 173 and are then emitted towards the light guiding device 175. A pencil of light emerging from an emerging port of the light guiding device 175 is collected at the collective lenses 178, 179 and is then guided towards the light shining mirror 185.

The light shining mirror 185 reflects the pencil of light collected at the collective lenses 178, 179 and shines it on the display device 51 at a predetermined angle via the condenser lens 195. The display device 51, which takes the form of DMD, is provided on a side of a heat sink 190 that faces the rear panel 13, whereby the display device 51 is cooled by this heat sink 190.

The pencil of light, which is the light source light shined on to an image forming surface of the display device 51 by the light source-side optical system 170, is reflected on the image forming surface of the display device 51 and is then projected on to a screen by way of the projection optical system 220 as projected light. Here, the projection optical system 220 is made up of the condenser lens 195, the movable lens group 235, and a fixed lens group 225. The movable lens group 235 is configured to be moved by the lens motor or manually. In addition, the movable lens group 235 and the fixed lens group 225 are incorporated in a fixed lens barrel. Thus, the fixed lens barrel including the movable lens group 235 is configured as a variable-focus lens enabling zooming and focusing controls.

By configuring the projector 10 in the way that has been described heretofore, when light is emitted from the excitation light shining device 70 and the red light source device 120 at appropriate timings, light in the blue wavelength range, light in the green wavelength range, and light in the red wavelength range are incident on the display device 51 by way of the light guiding optical system 140 and the light source-side optical system 170. Due to this, the display device 51, which takes the form of DMD, of the projector 10 displays light in each of the blue, green and red wavelength ranges in accordance with the data in the time-sharing manner, whereby a colored image can be projected on to the screen.

Second Embodiment

Figure 5:
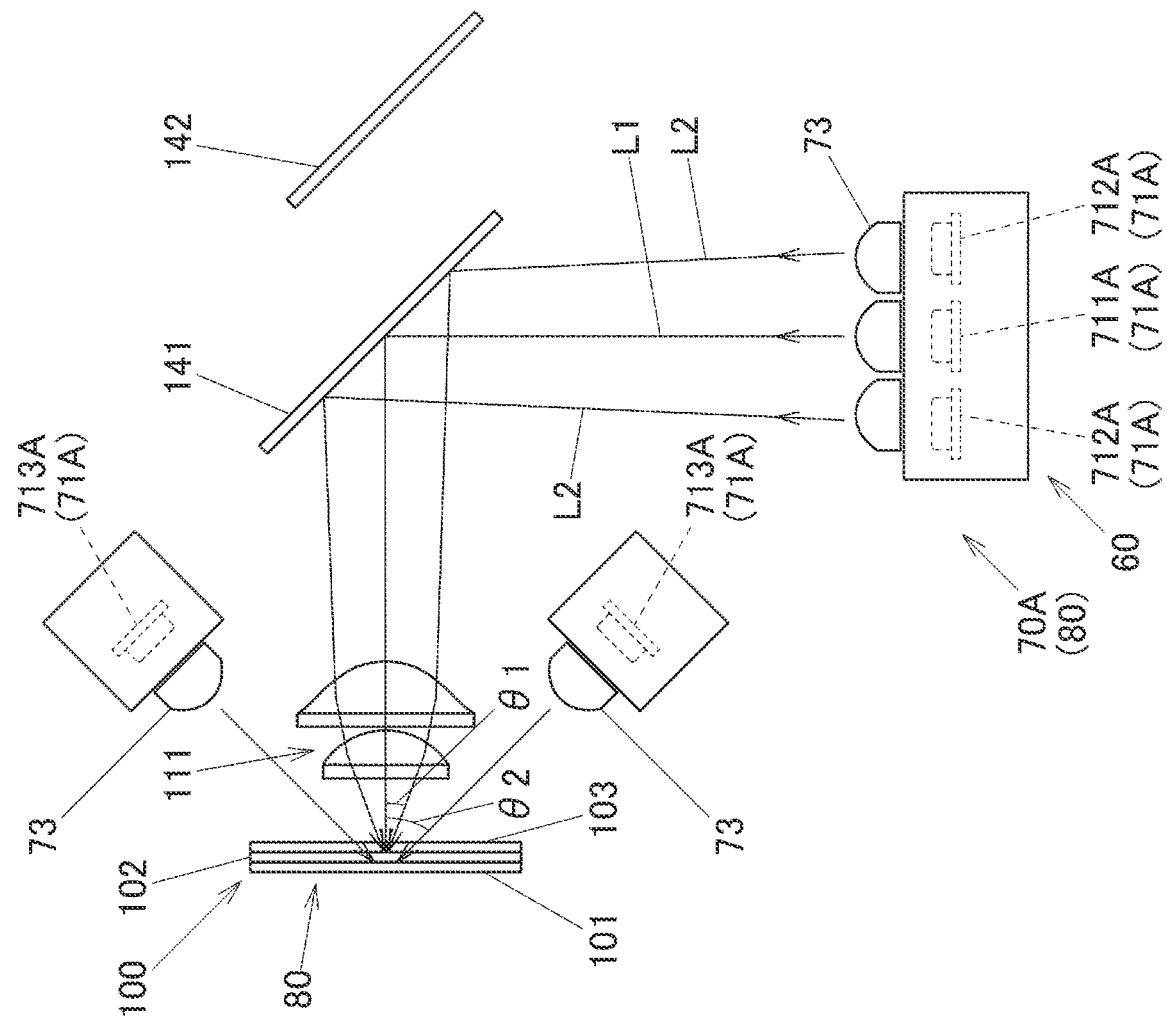
FIG. 5 is a partially plan schematic view of a light source unit according to a second embodiment of the present invention.

Next, a second embodiment will be described. FIG. 5 is a schematic plan view illustrating part of a light source unit 60 according to the second embodiment. In this embodiment, blue laser diodes 711A, 712A (a first light source) configured to emit light beams L1, L2 in the blue wavelength range in such a manner as to be incident on a dichroic filter 102 at a first incident angle θ1 and blue laser diodes 713A (a second light source) configured to emit light beams L3 in the blue wavelength range in such a manner as to be incident on the dichroic filter 102 at a second incident angle θ2 are not arranged side by side or into a matrix of rows and columns. In the description of the second embodiment, like reference signs will be given to like configurations to those of the first embodiment, and descriptions thereof will be omitted or simplified here.

Light beams L1, L2 in the blue wavelength range emitted from the blue laser diodes 711A, 712A travel along a similar optical path to that of the first embodiment. In other words, light beams L1, L2 in the blue wavelength range emitted by the blue laser diodes 711A, 712A are incident on a polarization beam splitter 141 as s-polarized light and are then reflected towards a collective lens group 111 by the polarization beam splitter 141. The light beams L1, L2 in the blue wavelength range are collected at the collective lens group 111, thereafter are shifted in phase 90 degrees by a quarter wave plate 103 to thereby be converted from linearly polarized light to circularly polarized light, and are finally incident on the dichroic filter 102. Since the light beams L1, L2 in the blue wavelength range are incident on the dichroic filter 102 at the first incident angle θ1, most of them are reflected at the dichroic filter 102.

The light beams L1, L2 in the blue wavelength range reflected by the dichroic filter 102 pass again through the quarter wave plate 103 to be shifted in phase another 90 degrees to thereby be converted from the circularly polarized light to linearly polarized light. A polarization direction at this time constitutes a polarization direction (a second polarization direction) that differs 90 degrees from a polarization direction (a first polarization direction) in which the light beams L1, L2 in the blue wavelength range are incident on a luminescent light emitting device 100 from the polarization beam splitter 141. The light beams L1, L2 in the blue wavelength range emitted from the quarter wave plate 103 are collected at the collective lens group 111 and are then incident on the polarization beam splitter 141 as p-polarized light. Consequently, the polarization beam splitter 141 transmits the light beams L1, L2 in the blue wavelength range emitted from the luminescent light emitting device 100 and guides them to the dichroic mirror 142.

On the other hand, the blue laser diodes 713A are not arranged on the same plane or straight line as that of the blue laser diodes 711A, 712A but are arranged in different positions from the blue laser diodes 711A, 712A. The blue laser diodes 711A, 712A and the blue laser diodes 713A emit light beams L1 to L3 in the blue wavelength range in different directions. Light beams L3 in the blue wavelength range emitted from the blue laser diodes 713A arrive at the dichroic filter 102 by way of a smaller number of optical members (in FIG. 5, excluding the polarization beam splitter 141 and the collective lens group 111) than the number of optical members by way of which the light beams L1, L2 in the blue wavelength range emitted from the blue laser diodes 711A, 712A arrive thereat. As a result, the blue laser diodes 713A can cause light beams L3 in the blue wavelength range to be directly incident on the luminescent light emitting device 100 without involving the polarization beam splitter 141 and the collective lens group 111, whereby it becomes easier to set the second incident angle θ2 greater than in the first embodiment. In the case where the second incident angle θ2 is set greater than in the first embodiment, the transmission characteristics Tp2, Ts2 shown in FIG. 4B shift further towards the short wavelength side, facilitating the transmission of light beams L3 in the blue wavelength through the dichroic filter 102. Light beams L3 in the blue wavelength range emitted from the blue laser diodes 713A are emitted towards the dichroic filter 102 as p-polarized light or s-polarized light.

Similar to the first embodiment, the light beams L3 in the blue wavelength range that have passed through the dichroic filter 102 are incident on a luminescent plate 101 to excite a green luminescent material formed on the luminescent plate 101.

Light in the green wavelength range emitted from the luminescent plate 101 is incident on the dichroic filter 102. Since light in the green wavelength range is light having a longer wavelength than light in the blue wavelength range, light in the green wavelength range passes through the dichroic filter 102 to be incident on the quarter wave plate. Thereafter, the light in the green wavelength range passes through the quarter wave plate while being shifted in phase 90 degrees, is collected by the collective lens group 111 and is then emitted towards the polarization beam splitter 141. The polarization beam splitter 141 transmits the light in the green wavelength range collected at the collective lens group 111 and guides it to a dichroic mirror 142.

Thus, in the configuration of the second embodiment that has been described heretofore, since the blue laser diodes 711A, 712A are provided separate from the blue laser diodes 713A, the incident angle at which the light beams L3 in the blue wavelength range, configured to excite the green luminescent material, are incident on the dichroic filter 102 can be set greater. This enables the reflection or transmission of light beams L1 to L3 in the blue wavelength range of the same color system at the dichroic filter 102 to be controlled easily, thereby making it possible to improve the color repeatability of light in the green wavelength range and light in the blue wavelength range that are emitted from the luminescent light emitting device 100.

Although the luminescent light emitting device 100 is described as being the integral member, part or the whole of the luminescent plate 101, the dichroic filter 102 and the quarter wave plate 103 may be formed as separate elements.

The blue laser diodes 711 to 713 of the first embodiment and the blue laser diodes 711A to 713A of the second embodiment may be disposed opposite to the luminescent light emitting device 100 so that light beams in the blue wavelength range emitted from those blue laser diodes are guided to the luminescent light emitting device 100. In this case, the light source unit 60 can be configured so that light in the blue wavelength range and light in the green wavelength range that are emitted from the luminescent light emitting device 100 are reflected on the polarization beam splitter 141 to be guided to the dichroic mirror 142 that is arranged appropriately on the optical path. The dichroic mirror 142 may be configured to reflect the light in the blue wavelength range and light in the green wavelength range that are guided thereto from the polarization beam splitter 140 and transmit light in the red wavelength range emitted from the red light source device 120, whereby the light in the blue wavelength range, the light in the green wavelength range, and the light in the red wavelength range are combined together to be guided to the light source-side optical system 170.

In the embodiments, although the polarization beam splitter 141 is described as reflecting light in the form of s-polarized light and transmitting light in the form of p-polarized light, the polarization beam splitter may be configured to reflect light in the form of p-polarized light and transmit light in the form of s-polarized light.

Thus, as has been described heretofore, the light source unit 60 and the projector 10 include the first light source and the second light source that are configured to emit light in the first wavelength range, the luminescent plate 101 configured to be excited by light in the first wavelength range to emit light in the second wavelength range, and the dichroic filter 102 provided on the one surface side of the luminescent plate 101 and configured to transmit light in the second wavelength range. Light in the first wavelength range emitted from the first light source is incident on the dichroic filer 102 at the angle falling in the first incident angle range, and light in the first wavelength range emitted from the second light source is incident on the dichroic filter 102 at the angle falling within the second incident angle range that is greater than the first incident angle range.

As a result, although the first light source and the second light source constitute the light sources that emit light in the same wavelength range, the first light source and the second light source can be disposed in the different positions, whereby the first light source and the second light source can emit light that is reflected by the dichroic filter 102 and light that passes through the dichroic filter 102. In addition, the luminescent plate 101 can emit light in the blue wavelength range and light in the green wavelength range in the time-sharing manner without switching the area where light in the first wavelength range emitted from the first light source and the second light source is shined in the time-sharing manner.

Thus, the light source unit 60 and the projector 10 that are simplified in configuration can be provided.

The light source unit 60 includes the polarization beam splitter 141 and the quarter wave plate 103. The polarization beam splitter 141 reflects or transmits light in the first wavelength range and in the first polarization direction emitted from the first light source and the second light source towards the dichroic filter 102 and transmits or reflects light in the first wavelength range and in the second polarization direction that differs in phase 90 degrees from the first polarization direction towards the dichroic filter 102. The quarter wave plate 103 is disposed between the polarization beam splitter 141 and the dichroic filter 102. As a result of the configuration described above, light in the first wavelength range emitted from the dichroic filter 102 can be guided for use in the different direction from the direction in which light from the first light source and the second light source is guided.

In the light source unit 60, the dichroic filter 102 is formed on the luminescent plate 101, and the quarter wave plate 103 is formed on the dichroic filter 102. Thus, in the light source unit 60, the optical member including the dichroic filter 102 and the quarter wave plate 103 can be formed small.

The light source unit 60 includes the third light source and the dichroic mirror 142. The third light source emits light in the third wavelength range that differs from the wavelength ranges of light in the first wavelength range and light in the second wavelength range. The dichroic mirror 142 transmits or reflects light in the first wavelength range and light in the second wavelength range emitted from the polarization beam splitter 141 and reflects or transmits light in the third wavelength range emitted from the third light source. As a result, in the light source unit 60, light in the third wavelength range can be combined with light in the first wavelength range and light in the second wavelength range on the same optical path to be guided as light source light.

The light source unit 60 can emit light in the first wavelength range and light in the second wavelength range in the time-sharing manner, and hence, the light source unit 60 can emit light in the first wavelength range and light in the second wavelength range emerging from the dichroic filter 102 in the time-sharing manner.

The light source unit 60 includes the dichroic filter 102 configured so that when the incident angle of light incident thereof is the first incident angle θ1, the cuton wavelength ranges of the transmission characteristics Ts1, Tp1, Ts2, Tp2 are situated on the long wavelength side of the light in the first wavelength range, whereas when the incident angle of light incident thereof is the second incident angle θ2 that is greater than the first incident angle θ1, the cuton wavelength ranges are situated on the short wavelength side of the light in the first wavelength range. Thus, with the light source unit 60, the light in the first wavelength range can easily be shined onto the luminescent plate 101 by increasing the incident angle of the light in the first wavelength range.

In addition, the second light source is provided side by side with the first light source, and light in the first wavelength range emitted from the second light source arrives at the dichroic filter 102 by way of the optical members such as the polarization beam splitter 141 and the collective lens group 111 by way of which light in the first wavelength range emitted from the first light source arrives at the dichroic filter 102. Due to this, the first light source and the second light source can be incorporated into the same holding member by laying the first light source and the second light source adjacent to each other, whereby the first light source and the second light source can be disposed in a small exclusive space with good efficiency.

In addition, the second light source is disposed in the different position from the position where the first light source is disposed, and light in the first wavelength range emitted from the second light source arrives at the dichroic filter 102 by way of a smaller number of optical members than the number of optical members by way of which light in the first wavelength range emitted from the first light source arrives at the dichroic filter 102. Due to this, the degree of freedom in arrangement of the second light source can be improved in an attempt, for example, to increase the second incident angle θ2.

The first light source and the second light source are the blue laser diodes for emitting light beams L1 to L3 in the blue wavelength range as light in the first wavelength range. Due to this, not only can light in the blue wavelength range be emitted as light source light, but also light in the green wavelength range which is situated closer to the long wavelength side than light in the blue wavelength range can be emitted as luminescent light from the luminescent plate 101.

In the embodiment described above, a color wheel (not shown) can be provided directly before an incident surface of the light guiding device 175 that is positioned on the optical path of light emitted from the blue laser diodes 711 (71) to 713 (71) of the excitation light shining device 70.

The color wheel is made up of three segments. These three segments are a diffuse transmission zone configured to transmit light in the blue wavelength range while diffusing it, a red transmission zone configured to transmit light in the red wavelength range, and a green selection filter configured to reflect or absorb light in the blue wavelength range that is not used for excitation of the green luminescent material on the luminescent plate 101 in transmitting light in the green wavelength range. These three segments are provided end to end in a circumferential direction at predetermined angular intervals. In addition, the color wheel can rotate around a rotational axis that is parallel to an optical axis direction by the controller and rotates in such a manner as to match timings at which light in each of the blue, green, red wavelength ranges is emitted in the time-sharing manner.

In the embodiments, the dichroic mirror 142 is described as being provided to reflect light in the red wavelength range emitted from the red light source device 120 towards the collective lens 173, but the present invention is not limited to this configuration. The red light source device 120 may be disposed so that the polarization beam splitter 141 is positioned on an axis of light in the red wavelength range emitted from the red light source device 120. In this case, a reflection film configured to reflect only light in the red wavelength range is formed on a surface of the polarization beam splitter 141 on to which light in the red wavelength range emitted from the red light source device 120 is shined. Since the dichroic mirror 142 can be eliminated by this configuration, the light source unit 60 can be miniaturized.

While the embodiments and modified examples of the present invention have been described heretofore, the embodiments and the modified examples are presented as examples, and hence, there is no intention to limit the scope of the present invention by these embodiments and modified examples. These novel embodiments can be carried out in other various forms, and various omissions, replacements and modifications can be made to the embodiments without departing from the spirit and scope of the present invention. Those resulting embodiments and their modifications are included in the spirit and scope of the present invention and are also included in the scope of inventions claimed for patent under claims below and their equivalents.

What is claimed is:

1. A light source unit comprising:
a luminescent plate configured to be excited by light in a first wavelength range to emit light in a second wavelength range;
a dichroic filter provided on one surface side of the luminescent plate;
a first light source that is configured to emit light in the first wavelength range to the surface of the dichroic filter opposite to the luminescent plate side; and
a second light source that is arranged at a position different from the first light source and emits the light in the first wavelength range to the surface of the dichroic filter opposite to the luminescent plate side,
wherein the first light source is arranged so as to emit the light in the first wavelength range to the dichroic filter at a first incident angle such that a reflectance of the light in the first wavelength range is larger than a transmittance of the light in the first wavelength range, and
wherein the second light source is arranged so as to emit the light in the first wavelength range to the dichroic filter at a second incident angle such that a transmittance of the light in the first wavelength range is larger than a reflectance of the light in the first wavelength range.

2. The light source unit according to claim 1, comprising:
a polarization beam splitter configured to reflect or transmit the light in the first wavelength range in a first polarization direction emitted from the first light source to the dichroic filter and to transmit or reflect the light in the first wavelength in a second polarization that differs in phase 90 degrees from the first polarization direction; and
a quarter wave plate disposed between the polarization beam splitter and the dichroic filter.

3. The light source unit according to claim 2,
wherein the quarter wave plate is formed on the dichroic filter.

4. The light source unit according to claim 2, comprising:
a third light source configured to emit light in a third wavelength range that differs from wavelength ranges of the light in the first wavelength range and the light in the second wavelength range.

5. The light source unit according to claim 4, comprising:
a dichroic mirror configured to transmit or reflect the light in the first wavelength range and the light in the second wavelength range emitted from the polarization beam splitter and to reflect or transmit the light in the third wavelength range emitted from the third light source.

6. The light source unit according to claim 2,
wherein the light in the first wavelength range emitted from the second light source arrives at the dichroic filter by way of a smaller number of optical members than a number of optical members by way of which the light in the first wavelength range emitted from the first light source arrives at the dichroic filter.

7. The light source unit according to claim 1,
wherein the dichroic filter is formed so that when an incident angle of the light in the first wavelength range falls within the first incident angle, a cuton wavelength of a transmission characteristic is situated on a long wavelength side of the light in the first wavelength range, whereas when an incident angle of the light in the first wavelength range falls within the second incident angle that is greater than the first incident angle, the cuton wavelength is situated on a short wavelength side of the light in the first wavelength range.

8. The light source unit according to claim 1,
wherein the second light source is provided so that at least a part of the light in the first wavelength range emitted from the second light source transmits the dichroic filter and arrives at the luminescent plate.

9. The light source unit according to claim 1,
wherein the first light source is provided so that a portion of the light in the first wavelength range emitted from the first light source that is reflected by the dichroic filter is directed toward a collective lens, and
wherein the second light source is provided so that the light in the first wavelength range emitted from the second light source arrives at the luminescent plate, and the light in the second wavelength range emitted by the excitation of the luminescent plate is directed toward the collective lens.

10. The light source unit according to claim 1,
wherein the second light source is provided side by side with the first light source, and wherein the light in the first wavelength range emitted from the second light source arrives at the dichroic filter by way of a same optical member as an optical member by which the light in the first wavelength range emitted from the first light source arrives at the dichroic filter.

11. The light source unit according to claim 1,
wherein the light in the first wavelength range emitted from the second light source arrives at the dichroic filter by way of a smaller number of optical members than a number of optical members by way of which the light in the first wavelength range emitted from the first light source arrives at the dichroic filter.

12. The light source unit according to claim 1,
wherein the first light source and the second light source are a blue laser diode that emits light in a blue wavelength range as the light in the first wavelength range.

13. A projector comprising:
the light source unit according to claim 1;
a display device on to which light source light from the light source unit is shined to form image light;
a projection-side optical system configured to project the image light emitted from the display device on to a screen; and
a control unit configured to control the display device and the light source unit.

* * * * *